United States Patent
Kondamuri et al.

(10) Patent No.: US 10,798,200 B2
(45) Date of Patent: Oct. 6, 2020

(54) PAYLOAD MATCHING VIA SINGLE PASS TRANSFORMATION OF HTTP PAYLOAD

(71) Applicant: VMware, Inc., Palo Alto, CA (US)

(72) Inventors: Chandra Sekhar Kondamuri, San Jose, CA (US); Neelima Balakrishnan, Santa Clara, CA (US); Abhinav Gupta, San Francisco, CA (US); Lingyan Huang, San Ramon, CA (US); Narendra Kumar Vyas Pentakota, Milpitas, CA (US); Abhijeet Joglekar, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/264,332

(22) Filed: Jan. 31, 2019

(65) Prior Publication Data
US 2019/0394291 A1    Dec. 26, 2019

Related U.S. Application Data

(60) Provisional application No. 62/688,772, filed on Jun. 22, 2018.

(51) Int. Cl.
*H04L 29/08* (2006.01)
*H04L 29/06* (2006.01)

(52) U.S. Cl.
CPC .......... *H04L 67/2814* (2013.01); *H04L 67/02* (2013.01); *H04L 69/22* (2013.01); *H04L 69/324* (2013.01)

(58) Field of Classification Search
CPC combination set(s) only.
See application file for complete search history.

(56) References Cited

U.S. PATENT DOCUMENTS

| 8,024,802 | B1 | 9/2011 | Preston | |
|---|---|---|---|---|
| 9,483,286 | B2 | 11/2016 | Basavaiah | |
| 2011/0268119 | A1* | 11/2011 | Pong | H04L 47/32 370/392 |
| 2013/0034100 | A1 | 2/2013 | Goyal et al. | |
| 2015/0067753 | A1* | 3/2015 | Shemesh | H04N 21/234345 725/116 |
| 2015/0341212 | A1 | 11/2015 | Hsiao et al. | |
| 2017/0220218 | A1* | 8/2017 | Zhao | G05B 15/02 |

OTHER PUBLICATIONS

International Search Report and Written Opinion of Commonly Owned International Patent Application PCT/US2019/019028, dated May 14, 2019, 9 pages, International Searching Authority (US).
Non-Published Commonly Owned International Patent Application PCT/US2019/019028, filed Feb. 21, 2019, 33 pages, Avi Networks.

\* cited by examiner

*Primary Examiner* — Saba Tsegaye
(74) *Attorney, Agent, or Firm* — Adeli LLP (57) ABSTRACT

In an embodiment, a method of payload matching via a single pass transformation of an HTTP payload includes receiving a payload packet destined for a recipient and parsing the payload packet in a single scan of the packet using a combined regular expression. The combined regular expression includes a plurality of regular expressions that correspond to a set of replacement rules. The method includes determining a scatter-gather list conforming to the rule, constructing a new payload packet based on the scatter-gather list, and sending the new payload packet to the recipient.

20 Claims, 9 Drawing Sheets

Combined Regular Expression: (a+) | (b+) | (c+)   620

Regular Expression Table 612

| Index | Regular Expression | Replacement String |
|---|---|---|
| R0 | a+ | foo |
| R1 | b+ | bar |
| R2 | c+ | helloworld |

Replacement Strings 614

Capture Table 616

| Capture Index | Regular Expression Table Index |
|---|---|
| 0 | R0 |
| 1 | R1 |
| 2 | R2 |

FIG. 6

Regular Expression Table 712

| Index | Regular Expression | Replacement |
|---|---|---|
| R0 | a+ | foo |
| R1 | b+(c+) | bar$1 |
| R2 | d+ | helloworld |

Replacement Strings 714

| foo | bar | helloworld |
|---|---|---|
| X1 | X2 X3 | X4 |

Capture Table 716

| Capture Index | Regular Expression Table Index |
|---|---|
| 0 | R0 |
| 1 | R1 |
| 2 | R1 |
| 3 | R2 |

PAYLOAD MATCHING VIA SINGLE PASS TRANSFORMATION OF HTTP PAYLOAD

CROSS REFERENCE TO OTHER APPLICATIONS

This application claims priority to U.S. Provisional Patent Application No. 62/688,772 entitled PAYLOAD MATCHING VIA SINGLE PASS TRANSFORMATION OF HTTP PAYLOAD filed Jun. 22, 2018, which is incorporated herein by reference for all purposes.

BACKGROUND OF THE INVENTION

A proxy server is a computer system that acts as an intermediary between devices. A proxy server can intercept requests from devices (e.g., clients) seeking resources from other devices (e.g., servers). For example, a client requests a service such as a file, connection, webpage, or other resource. The proxy server receives a request, evaluates it, and forwards it to the destination. Similarly, in the return path, the proxy server is an intermediary for delivering a resource to the requesting client. A web proxy is a type of proxy server that facilitates access to content on the Internet using a protocol such as HTTP. The web proxy processes HTTP requests made up of one or more packets. Existing web proxies make multiple passes through HTTP payload to apply transformation rules, which can be inefficient and slow.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A proxy server transforms the payload of a request to redirect the request to the appropriate backend server. An example of a request is an HTTP transaction, which is typically made up of a header and a payload/body. For example, the proxy server can transform the request and response (in a way transparent to the user) to/from the backend server to adhere to semantics/policies without modifying the backend server. All references to "www.abc-usa.com" can be transformed to "www.abc.com/usa" without changing webpages in the backend server. The HTTP transaction can be received over one or more packets. Conventionally, the proxy server makes multiple passes through the payload, scanning and processing the payload from beginning to end several times to perform multiple transformations of the payload, which can be slow. In addition, the proxy server usually needs the entire payload in order to perform the transformation. However, the payload may be broken up into several packets, so waiting for all of the packets to arrive also contributes to latency. A process for transforming a payload in a single pass (or scan) of a packet is disclosed. In one aspect, the single pass payload transformation techniques described here improve the technical field of Web traffic handling. In another aspect, the techniques improve the functioning of a proxy server by better using available resources such as reducing the number of processing cycles used to complete a payload transformation or using less memory to store data associated with payload transformation. First, an exemplary client, proxy server, and server system will be described.

Figure 1:
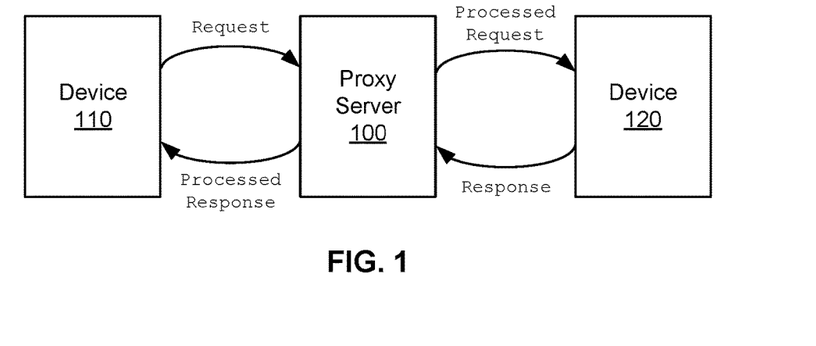
FIG. 1 is a block diagram illustrating an embodiment of a system for payload matching via single pass transformation of a payload.

FIG. 1 is a block diagram illustrating an embodiment of a system for payload matching via single pass transformation of a payload. The system includes a proxy server 100, a first device 110, and a second device 120. For simplicity, the first device 110 will be called a client and the second device 120 will be called a server. However, this is not intended to be limiting and a proxy server can be an intermediary between any two devices such as two clients.

The proxy server 100 is configured to receive a request from client 110, process the request, and pass the request (or a processed version of the request) to server 120. The proxy server is also configured to receive a response from server 120, process the response, and pass the response (or a processed version of the response) to the client 110. Using the example of a web server, the proxy server receives an HTTP request. A typical HTTP request includes a header (metadata) and a payload. The proxy server may process the HTTP request by altering the payload, for example replacing an external web address with an internal web address. Rewriting an HTTP payload while transmitting web data between a client and a backend server causes the HTTP request to be routed to a specific backend server. The proxy server may transform the payload because the same backend server is used for multiple applications. Rewriting the HTTP payload allows transformation of the domains and/or obfuscation of any sensitive information in the Web data. For example, all references in a webpage can be rewritten from an external address (www.a-internal.com) to an internal address (www.a.com/internal). The proxy server may be an attractive processor for rewriting HTTP payloads because it typically handles incoming and outgoing traffic, and so it is a central point of control to process web data rendered by backend servers without needing to change the backend applications. The proxy server then passes the processed request, which is the altered HTTP request with the internal web address, to the server 120.

In some embodiments, the proxy server handles traffic to/from a virtual service. For example, the proxy server can be part of a service engine. The service engine can be a stand-alone service engine or can be implemented by a distributed network system in which instances of target network applications (e.g., instance of web applications, email applications, etc.) are configured to execute within virtual machines (VMs) on multiple physical devices. Multiple service engines are configured to operate on the physical devices. The service engines and a controller cooperate to implement a distributed network service for the target network applications. Traffic is redirected by the service engine to the appropriate instance of the target application for processing. The distributed network service shares and configures the processing resources of multiple physical devices, and eases the bottle neck problem commonly associated with distributed architectures having a centralized point of distribution.

Figure 2:
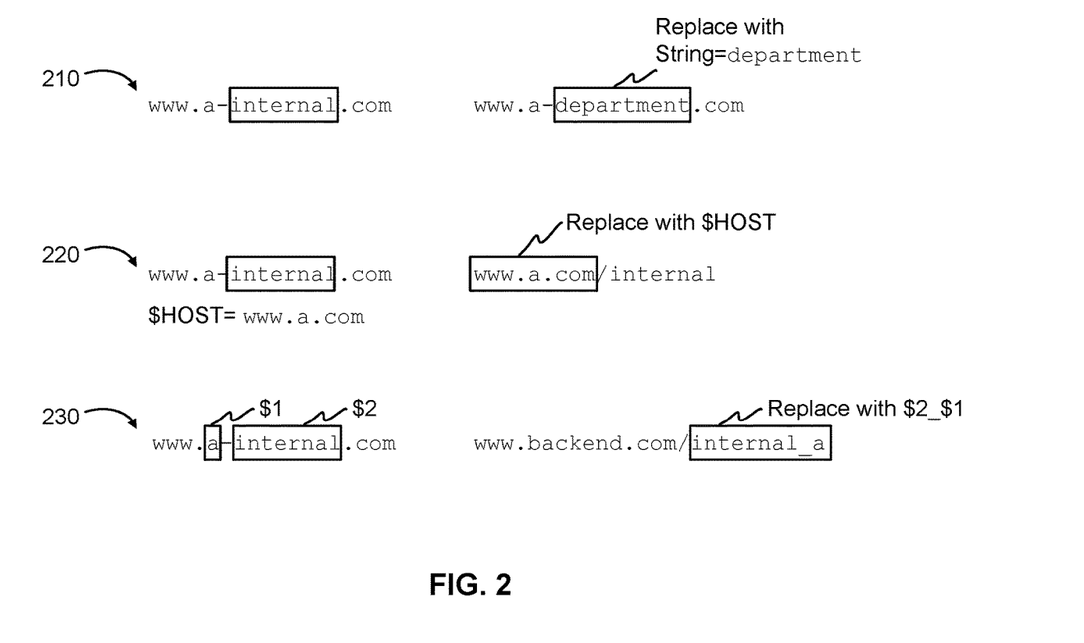
FIG. 2 illustrates examples of transforming an HTTP payload. Three types of transformations are pictured.

FIG. 2 illustrates examples of transforming an HTTP payload. Three types of transformations are pictured. In the first example 210, the HTTP request (URL) "www.a-internal.com" is transformed to "www.a-department.com." In this type of transformation (called a string transformation), at least a portion of the payload is replaced by a string literal. Here, the string is "department" and the portion that is replaced is "internal."

In the second example 220, the HTTP request (URL) "www.a-internal.com" is transformed to "www.a.com/internal." The request is received with HTTP HOST header "www.internal.com." The rule in this example is to replace the payload with $HOST. In this type of transformation (called a variable transformation), at least a portion of the payload is replaced by a variable. The variable can be determined from the received HTTP request, for example, a value derived from the header of the HTTP request. Here, the variable ($var) is "internal" and the transformation appends $var to the end of an internal address, resulting in "www.a.com/internal."

In the third example 230, the HTTP request (URL) "www.a-internal.com" is transformed to "www.backend.com/internal_a." In this type of transformation (called a replacement transformation), a first piece of the payload and a second piece of the payload are swapped and appended to a backend address (www.backend.com). In other words, the positions of two or more pieces of the payload are rearranged. Here, the first piece is stored in variable $1 (value is "a") and the second piece is stored in variable $2 (value is "internal"). The transformation appends $2_$1 to the end of an address, resulting in "www.backend.com/internal_a."

Payload transformations including more complex transformations can be formed using a combination of the three types of examples described above. For example, prefixes, suffixes, and the like can be added to pieces of the payload. A user/administrator can define how to transform the payload such as the strings used for replacement, what gets replaced, and the like using rules. In some embodiments, a user/administrator defines a policy regarding redirection of requests to backend servers, and a processor such as 304 programmatically implements the policy by formulating replacement rules. In some embodiments, a user/administrator defines the replacement rules themselves. A set of replacement rules can be applied to a payload to make multiple transformations or more complex transformations. One scheme for finding and matching payload pieces is Perl Compatible Regular Expression (PCRE). Regular expressions (regexes) are further described with respect to FIG. 3.

Payload transformations such as these three examples are conventionally performed by making multiple passes through the payload. Usually a proxy server (e.g., 100 of FIG. 1) scans a payload for each regular expression. By contrast, the techniques described below make a single pass to transform the payload. Although the examples chiefly address HTTP payload transformation, the techniques find application in other types of payloads as well such as those using TCP proxy. The techniques transform a payload in streaming fashion without needing to buffer an entire request. Packets of a payload can be processed (performing matching) in real time, without needing to receive a full payload, and the packets can be processed without parsing them multiple times. Processing speed is significantly increased over existing techniques. The payload transformation process can be performed by a proxy server such as the one shown below.

Figure 3:
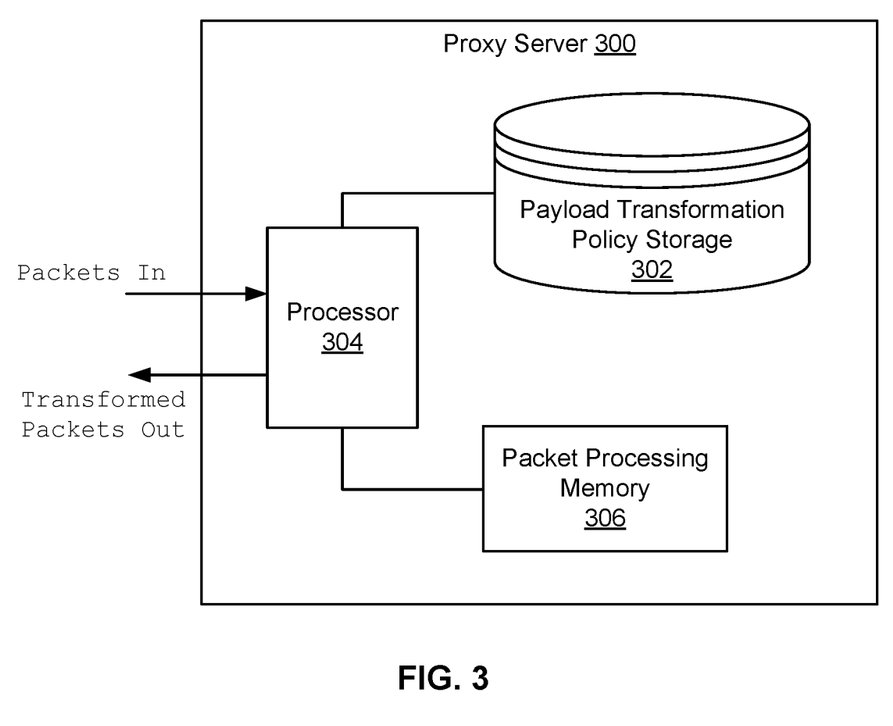
FIG. 3 is a block diagram illustrating an embodiment of a proxy server system.

FIG. 3 is a block diagram illustrating an embodiment of a proxy server system. The proxy server 300 is an example of how proxy server 100 can be implemented. The system includes payload transformation policy storage 302, processor 304, and packet processing memory 306. In various embodiments, payload transformation policy storage 302 and packet processing memory 306 can be implemented on a single storage device or on more storage devices.

Payload transformation policy storage 302 is configured to store policies defining how payloads are handled. For example, a policy can be expressed by a set of replacement rules for how to transform a payload packet. Suppose an incoming URL is "www.a.com/page1," and in the backend this type of URL will be served by "Destination B." A policy can specify that the incoming URL be translated to "www.a.com/destination_b/page1" to redirect the request to "Destination B." A policy can be described by (implemented by applying) a set of replacement rules, which define how to match or replace pieces of a payload. One or more regular expressions carry out the policy. Here, the rule would cause the proxy to detect "www.a.com" and inject "destination_b" into the URL before any other subpages/file paths in the URL (e.g., page1). Policies are agnostic to specific protocols or languages. The set of rules can be expressed in various protocols such as PCRE, ICU, Jakarta, XRegExp, and the like. The techniques described here find application to various type of proxies that exchange data, and will be chiefly described using the example of HTTP. A set of rules can be encapsulated by generating two types of tables: a regular expression table to store a mapping of regexes to replacement values (e.g., strings/variables), and a capture table to store a mapping of capture indices to regex indices. Using the example of PCRE, a capture (sometimes called a capturing group) refers to a parenthesis that groups the regex between the parentheses. The parentheses capture the text matched by the regex into a numbered group that can be reused with a reference. Regex operators can be applied to the entire grouped regex. Each of the regular expression table and a capture table is further described below.

Using the example of PCRE, a user configures a policy by giving a set of regular expressions with its corresponding replacements such as a replacement string or variable. A regular expression (regex) is a text string that describes patterns to find text or positions within a body of text. In the context of payload transformation, a regex can be used to find, replace, and split strings. A regex engine such as PCRE has a library of expressions. The examples here are described using PCRE, but this is not intended to be limiting and other types of regex engines or libraries may be used instead. A regex can include a quantifier. For example "+" means one or more and "*" means zero or more. The regular expression a+, which means "a" appearing one or more times, would match "aaa," because "a" appears three times. A regex can include logic. For example, the character "|" is an alternation operator (i.e., OR). "( . . . )" is a capturing group. For the regex "B(ear)" a sample match is "Bear" and the portion captured is "ear".

Figure 6:
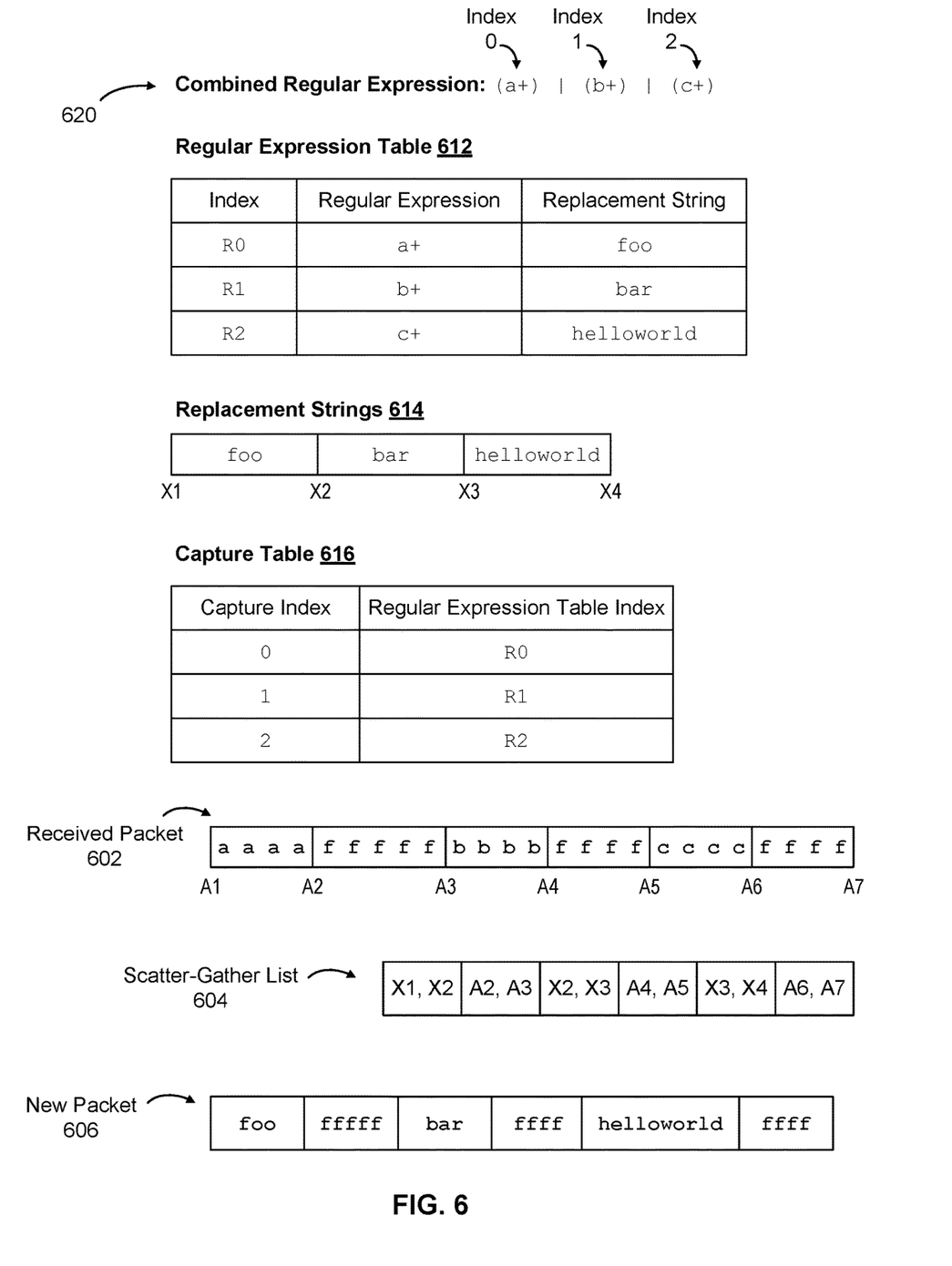
FIG. 6 illustrates an example of payload matching via single pass transformation of a payload.

Packet processing memory 306 is configured to store regular expressions and their replacement strings or variables as well as mappings of a capture index to a regex index. In various embodiments, a regular expression table such as table 612 of FIG. 6 stores mapping of a regular expression to a replacement string. In table 612, the replacement for regex "a+" is a string "foo". In table 612, all of the replacements are string literals. In other examples, a regex may instead (or in addition) be replaced by something else. Replacements typically fall into one of three categories:

String literal. For example, foo, bar, helloworld are shown in table 612. A string literal can be used for a string transformation like 210.

Variable. The variable can be determined by evaluating at least a portion of a received payload packet, and using the value. For example, $URI is a variable whose value is given by a URI (URL). A variable can be used for a variable transformation like 220.

Subexpression. A subexpression is a portion of the received payload packet. In some embodiments, $1 to $9 store 9 subexpressions for example. Nine expressions is merely exemplary and not intended to be limiting. Fewer (additional) variables can be used for storing less (more) subexpressions. Suppose a regex is (b+)(c+) and the replacement subexpression is $2$1. If the payload is "aabbccdd" then $1=bb and $2=cc. Using the subexpression $2$1, the payload becomes aaccbbdd. That is, "bb" and "cc" get swapped. A subexpression can be used for a replacement transformation like 230.

In table 612 of FIG. 6, the table's index (also referred to as the regex index) identifies a particular mapping of regex to replacement string. In this table, each row represents a specific mapping. The index serves as an identifier for a replacement rule: rule R0 identifies a first mapping "a+" to "foo," rule R1 identifies a second mapping "b+" to "bar", and rule R2 identifies a third mapping "c+" to "helloworld". The index can be used to relate the regex table to a capture table, as further described below.

In table 612, each of "a+," "b+," and "c+," is a regex. Regexes can be combined to form a combined regex. In one aspect, a combined regex (also known as a compound regex) allows a payload packet to be processed in a single pass. This single-pass processing is also sometimes called a single scan of the payload packet to perform all desired matching and transformation of the payload. Instead of scanning the payload packet for each regex, which would require three separate scans of the payload packet in this example (for each of "a+," "b+," and "c+"), the payload packet is scanned once using a combined regex because the combined regex is a single expression that encodes all three regexes. The combined regex includes a plurality of regexes that correspond to a set of replacement rules. A combined regex is formed by capturing each regex and combining them with the OR operator (|). For example, a regex is "a+" and another regex is "b+". A combined regex for the two regexes is "(a+)|(b+)". A combined regex includes subcapture expressions, which refers to an expression of a capture within a capture as further described with respect to FIG. 7.

In various embodiments, a capture table such as 616 stores mappings of a capture index to a regex index. The capture table and mapping can be formed when a policy is configured. Suppose a user specified the regular expression and replacement strings shown in table 612. The combined regex would be determined to be "(a+)|(b+)|(c+)." This combined regex includes three captures: "a+," "b+," and "c+," which can be identified by indices. In this example, "a+" is at index 0, "b+" is at index 1, and "c+" is at index 2 as shown in the labelled combined regex 620 in FIG. 6. Each of the regexes in the combined regex may have corresponding replacement strings, variables, or subexpressions. Referring to table 612, the replacement strings are shown for each regex. To relate the capture index to rule/index (the corresponding regex to replacement mapping), the capture table has an entry for the capture index and its corresponding regex table index. The first row in capture table 616 shows a mapping of the capture at index 0 (a+) to regex table index R0. Referring to table 612, R0 is a mapping of "a+" to "foo." This allows the a+ in the combined regex to be related to its replacement string. In this simple example, each capture index has a different/respective regex index. It is possible for different capture indices to map to the same regex index.

Returning to FIG. 3, processor 304 is configured to receive requests and process them according to policies stored in 302. For example, the processor performs payload transformation by receiving a payload packet, looking up applicable policies in 302 for the payload packet, and transforming the payload according to the policies. In some embodiments, the policies are implemented by replacing regexes with replacements. The mapping of what to replace is stored in a regular expression table. In some embodiments, a combined regex is used in order to process the payload in a single pass. The combined regex is stored in a capture table, which relates captures to their positions in a regular expression table. In some embodiments, processor 304 creates capture tables and regex tables by translating the policies into a protocol specific implementation. For example, to implement a policy in PCRE, processor 304 breaks the policy down into regexes in PCRE and stores them in regex and capture tables. After processing the payload according to applicable policies, the proxy server forwards the transformed payload to a destination. Referring to FIG. 1, in the case of a request from device (client) 110, the transformed payload is sent to device (server) 120. In the case of a response from device (server) 120, the transformed payload is sent to device (client) 110.

Unlike conventional payload transformation, which usually requires a proxy server to store an entire transaction, request, or page before releasing to the destination, a payload is processed as it is streamed through the proxy server. As the payload is read in a single scan, pieces of the payload are stored and reused later to make replacements as necessary. The techniques reuse the same buffers that stored the streamed data without needing to make multiple copies of the payload. The proxy server transforms the payload in a single pass when it is received. The proxy server then forwards the payload to a destination without needing to store the entire transaction/page. This decreases latency, which means that fewer processing cycles and less memory are used to perform payload transformation. Processor 304 can be implemented by a system such as the one shown in FIG. 10.

In operation, processor 304 receives a request such as a payload packet destined for a recipient. The processor transforms the payload packet in a single pass by replacing portions of the payload packet that match a regex. For example, the processor parses the payload packet in a single scan using a combined regular expression, where the combined regular expression includes regular expressions that correspond to a set of replacement rules. The process determines a scatter-gather list including an address of at least one original payload piece and an address of at least one replacement payload piece. The scatter-gather list can be an input/output vector, also called an iovec, including content addresses of original payload piece(s) and content addresses of replacement payload piece(s). The process constructs a new payload packet based on the scatter-gather list, and sends the new payload packet, which is a transformation of the received packet, to the recipient.

Figure 4:
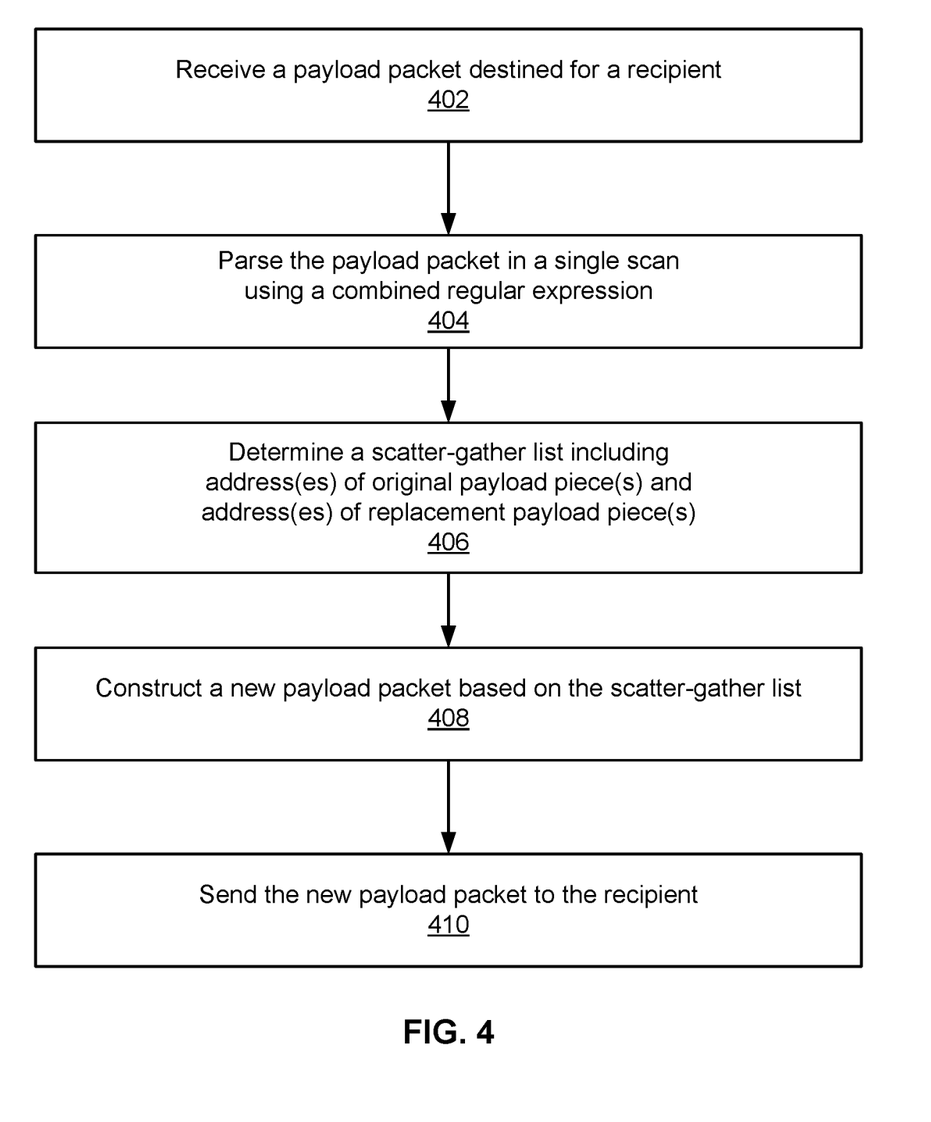
FIG. 4 is a flow chart illustrating an embodiment of a process for transforming a payload in a single pass.
Figure 7:
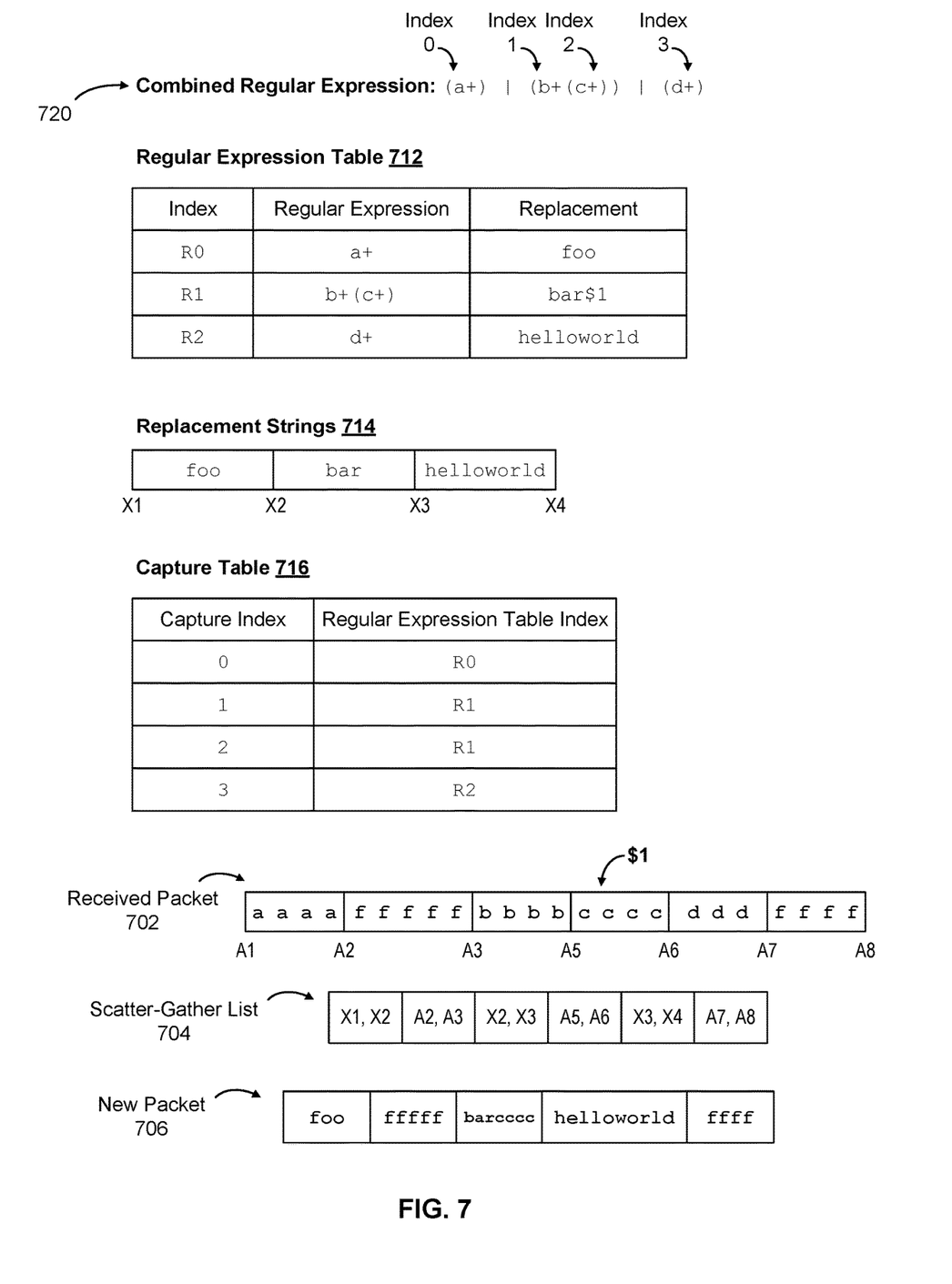
FIG. 7 illustrates an example of payload matching via single pass transformation of a payload using a regular expression with subcaptures.

FIG. 4 is a flow chart illustrating an embodiment of a process for transforming a payload in a single pass. The process can be performed by any type of proxy server including the one shown in FIG. 3. More specifically, the process can be performed by processor 304 in cooperation with (by looking up) payload transformation policy storage 302 and (storing intermediate data structures in) packet processing memory 306. The process will be described using the example shown in FIG. 6. FIG. 6 illustrates an example of payload matching via single pass transformation of a payload. In the example of FIGS. 6 and 7, the combined regex (620, 720) is user-defined, and the regular expression and capture tables are assembled from the combined regex, as further described below.

The process of FIG. 4 receives a payload packet destined for a recipient (402). Referring to FIG. 1, the process will be described for the example of a device (client) 110 sending an HTTP request destined for device (server) 120. The process also applies to the reverse direction in which device (server) 120 responds to device (client) 110 via the proxy server. Referring to FIG. 6, the received packet 602 is "aaaaffff-bbbbffffccccffff". Packet 602 is labelled with the locations of each piece of the packet. For example, "aaaa" is located at A1, "ffff" is located at A2, and so on. The system performing the process knows the boundaries (e.g., aaaa is one group, ffff is another group) because PCRE provides the beginning and end offset of a capturing pattern. Here, when a+ is matched, it is known that the capture index is 0 and the memory offsets corresponding to this capture index. The pieces in received packet 602 are original payload pieces.

Returning to FIG. 4, the process parses the payload packet in a single scan using a combined regular expression (404). In other words, in a single scan the process reads each character in the payload and matches groups of characters to regular expressions. The payload packet is processed according to one or more policies, which can be default system settings, defined by an administrator, or a combination. The policy can be encapsulated by regular expression table 612 and capture table 616. As described in greater detail with respect to FIG. 3, the regular expression table is a mapping of regexes to replacements and the capture table is a mapping of capture indices to regex table indices. The regular expressions in table 612 can be combined into a single combined regex. Here, the combined regex is "(a+)|(b+)|(c+)." The regexes can be identified by their positions within the combined regex. In this example, "a+" is at index 0, "b+" is at index 1, and "c+" is at index 2.

The process parses the received packet 602 in light of the combined regular expression. This means that pieces of the packet are matched to the combined regex. Here, "a+" which is a capture of one or more "a" characters matches the "aaaa" piece of the received packet, "b+" which is a capture of one or more "b" characters matches the "bbbb" piece of the received packet, and "c+" which is a capture of one or more "c" characters matches the "cccc" piece of the received packet.

Table 612 shows what is used to replace the regex. Packet piece "aaaa" (which matches "a+") gets replaced by "foo," "bbbb" (which matches "b+") gets replaced by "bar," and "cccc" (which matches "c+") gets replaced by "helloworld." The replacement strings 614, which are obtained from the regular expression table 612, are depicted with locations/offsets, showing that "foo" is located beginning at X1, "bar" beginning at X2, and "helloworld" beginning at X3. The pieces in replacement strings 614 are replacement payload pieces.

Returning to FIG. 4, the process determines a scatter-gather list including an address of at least one original payload piece and an address of at least one replacement payload piece (406). The scatter-gather list is assembled from addresses of the original and replacement payload pieces. Scatter-gather I/O (also known as vector I/O) is a way by which data is read from multiple buffers/locations and written to a single data stream. A scatter-gather list includes a list of content addresses (or pointers) of original payload piece(s) and content addresses of replacement payload piece(s). The scatter-gather list is determined by looking up a replacement based on a match of a payload piece to a combined regular expression. By reading the addresses (or pointers) in the scatter-gather list, a new (transformed) packet can be put together. The scatter-gather list indicates what data stored in memory to use without needing to directly modify a packet. An example of a data structure for implementing scatter-gather is an iovec. Referring to scatter-gather list 604, a pair of locations indicates the beginning and end, e.g., "X1, X2" is the location of "foo" because (referring to 614) foo is located between X1 and X2. The scatter-gather list 604 is formed by replacing pieces of the payload with addresses corresponding to the replacement strings shown in 614 according to regex matches. In some embodiments, when a regex does not appear in a regular expression table, then by default they are treated as not replaced.

Returning to FIG. 4, the process constructs a new payload packet based on the scatter-gather list (408). New packet 606, which is a transformation of received packet 602 according to policies, is formed by reading the locations in the scatter-gather list 604. More specifically, in this example, the first portion of scatter-gather list 604 is the location pair "X1, X2." Referring to replacement strings 614, looking up the beginning location X1 and the end location X2 yields string literal "foo." The first portion of new packet 606 is therefore "foo." Next, the scatter-gather list has location pair "A2, A3." Referring to received packet 602, looking up the beginning location A2 and the end location A3 yields packet piece "ffff." The second portion of new packet 606 is therefore "ffff." Next, the scatter-gather list has location pair "X2, X3." Referring to replacement strings 614, looking up the beginning location X2 and the end location X3 yields string literal "bar." The third portion of new packet 606 is therefore "bar." This continues until the entire scatter-gather list 604 has been processed to form new packet 606. The process then sends the new payload packet to the recipient (410). In various embodiments, the process sends the new payload packet to the recipient before receiving the end of an entire transaction/page associated with a sequence of payload packets. The parsing of the payload packet will now be described in greater detail.

Figure 5:
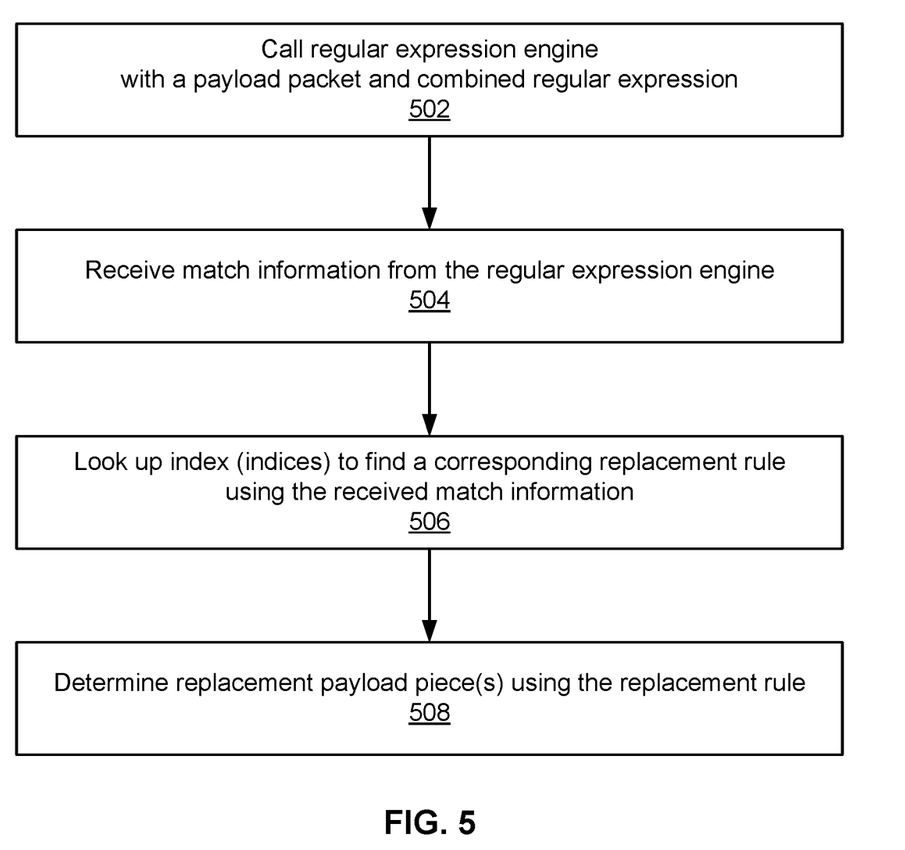
FIG. 5 is a flow chart illustrating an embodiment of a process for parsing a payload packet.

FIG. 5 is a flow chart illustrating an embodiment of a process for parsing a payload packet. The process can be performed as a part of another process such as the one shown in FIG. 4. The process of FIG. 5 is an example of 404 of FIG. 4.

The process begins by calling a regular expression engine with a payload packet and a combined regular expression (502). Calling the regex engine (e.g., with an API call) with the payload packet and the combined regex will return matches in the payload packet to the regexes of the compound regex and associated information, if any. An example of a regex engine is a PCRE library. The process makes an API call to the PCRE library with the received payload packet and combined regex. Referring to FIG. 6, the process calls a regex engine with received packet 602 and the compound regex "(a+)|(b+)|(c+)."

Returning to FIG. 5, the process receives match information from the regex engine (504). The match information allows the process to determine replacement(s) for the pieces of the payload packet. In various embodiments, the match information includes whether there is a match between at least a portion of the payload packet and the compound regex. The match information may also include the offsets of the match (the location of the payload piece matching the regex and the capture index indicating which regex in the combined regex matches the payload piece). Referring to FIG. 6, for payload piece "aaaa," the match information includes a positive match and the index 0, which is where the match occurred in the combined regex 620. Sometimes there is no match. For payload piece "ffff," a regex engine returns no match because "ffff" does not match any elements of the combined regex 620, and the payload piece can be treated according to administrative settings. For example, it can be added to a new payload packet.

In some embodiments, if there is no match, the payload piece is retained in the transformed payload (as in new packet 606). In some embodiments, the match information includes whether there is a partial match, meaning that part of the packet matches a regex but not fully. A partial match example is discussed in greater detail in FIG. 8.

Returning to FIG. 5, the process then looks up the one or more indices in a capture table to find the corresponding replacement rule using the received match information (506). Referring to FIG. 6, for payload piece "aaaa," which has capture index 0, the first row in capture table 616 matches capture index 0 to regular expression table rule R0.

Returning to FIG. 5, the process determines the replacement by looking up the replacement rule in a regular expression table (508). Referring to FIG. 6, for payload piece "aaaa," the first row in regular expression table 612 matches rule R0, so the replacement for "aaaa" is "foo."

Sometimes a regular expression can have one or more subcaptures, which are captures nested within other capture(s). The following figure shows one such example.

FIG. 7 illustrates an example of payload matching via single pass transformation of a payload using a regular expression with subcaptures. The example here is the same as FIG. 6 except for the following differences. The user specifies replacement strings for a+(foo), b+(bar$1), and c+ (helloworld). From the user's specifications, a combined regex is formed. Here, combined regular expression 720 here is "(a+)|(b+(c+))|(d+)." This example uses the character | as separators between regexes according to PCRE convention. That is, the regular expression at index R1 is "b+(c+)," which is an example of a subcapture. The combined expression captures the regular expression at R1, so there are two captures: "(b+(c+))". The combined regex can be compiled using a regex engine/library such as PCRE. This causes all subcaptures to be calculated. Captures or subcaptures are calculated by determining/assigning indices for the regex. In this example, there are two capture indices. Indices 1 and 2 belong to the same match replacement policy rule. If the rule uses $1 to replace a string, then the corresponding capture index to use is index 1. The regexes forming the combined regex can be identified by a capture indices. In the example shown in FIG. 7, combined regular expression 720 has a subcapture "(b+(c+))," capture index 1 (b+(c+)) and capture index 2 (c+) both map to R1 because they have the same replacement string. Another difference from FIG. 6 is that in this example, a user has designated that the replacement for "b+(c+)" is "bar$1," where $1 is a variable whose value is the subcapture of "c+."

The subcapture causes the capture table 716 to be constructed differently from capture table 616. In this example, since each capture has its own index, the capture of index 0 is "a+," the capture of index 1 is "b+(c+)," the capture of index 2 is "c+," and the capture of index 3 is "d+." The regular expressions corresponding to each of the capture indices are listed in table 716. Capture index 1 and capture index 2 both correspond to the same regular expression mapping (R1). This is because R1 maps the regular expression "b+(c+)" to "bar$1" so both regular expressions "b+" and "c+" are treated by looking up the same mapping/row in table 712.

Referring to received packet 702, for payload piece "bbbbcccc," the match information includes a match, and index 1 and index 2 because these pieces match b+(c+). The processor stores "bbbb" to capture index 1 and "cccc" to capture index 2 as shown in the labelled combined regex. The rows in capture table 716 match capture indices 1 and 2 to regular expression table rules R1 and R2. Using rule R1 of regular expression table 712, the process stores "cccc" as the value of variable $1 and sees that string literal "bar" should replace "bbbb."

When forming scatter-gather list 704, following "X2, X3" corresponding to "bar," the pointers will go to the location where $1 is, namely A5, A6 because the replacement for this expression is "bar$1" according to the regular expression table. Here, the value of $1 is "cccc" as shown. For payload piece "bbbbcccc," the second and third rows in regular expression table 712 match rules R1 and R2, so the replacement for "bbbbcccc" is "barcccc."

As described in greater detail above, when the new packet 706 is formed, the scatter-gather list is consulted for what to look up in memory. After X2, X3, the payload transformation process will look up A5, A6 in received packet 702 to form "barcccc" after "fffff" and before "helloworld."

Sometimes a payload packet or a portion of a packet does not fully match a regular expression. This can happen when information is sent across several packets. The following figures show an example of determining whether packets are partially matching and how to process partially-matching packets.

Figure 8:
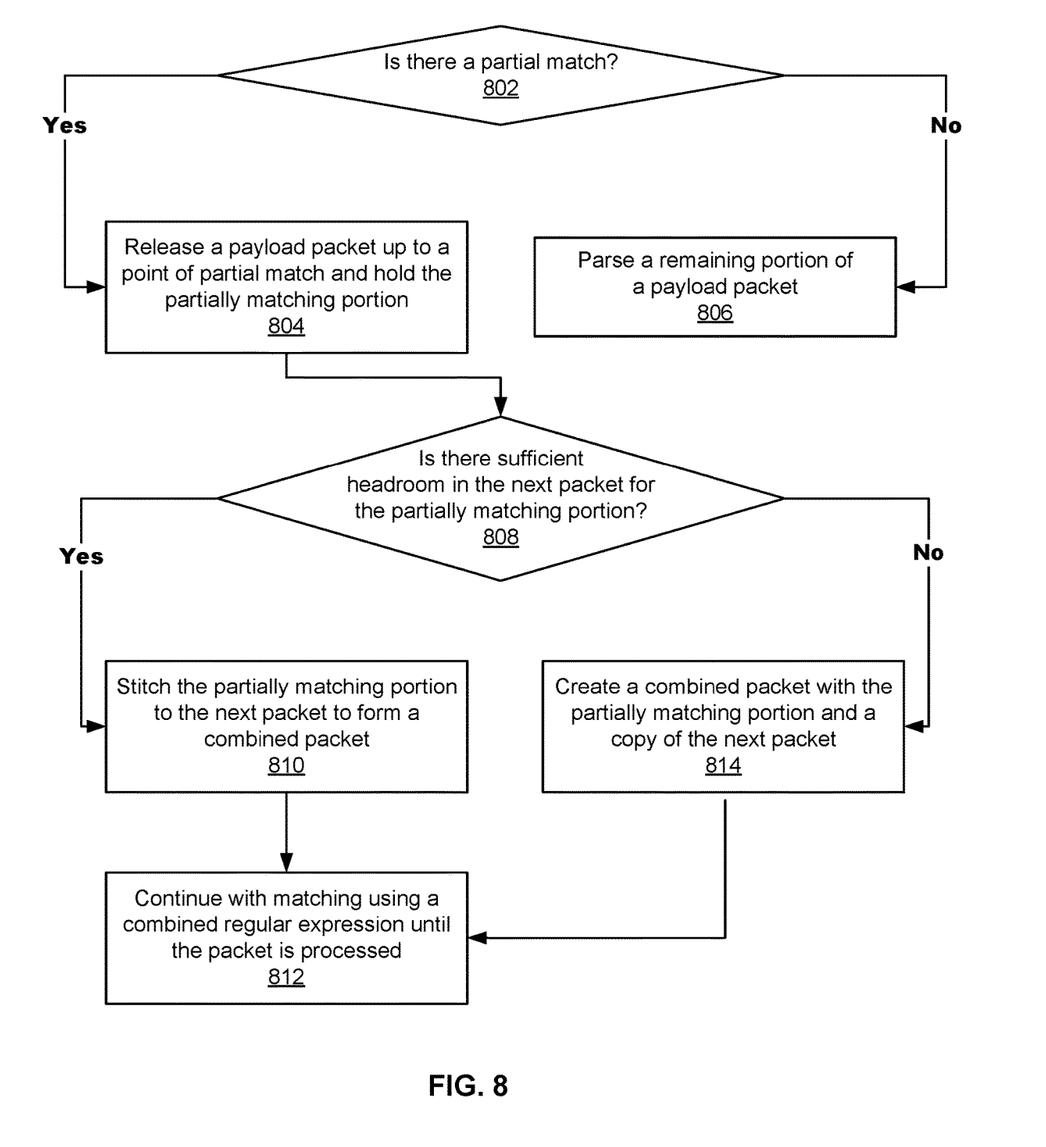
FIG. 8 is a flow chart illustrating an embodiment of a process for transforming a payload in a single pass in which a portion of a payload packet partially matches a regular expression.
Figure 9:
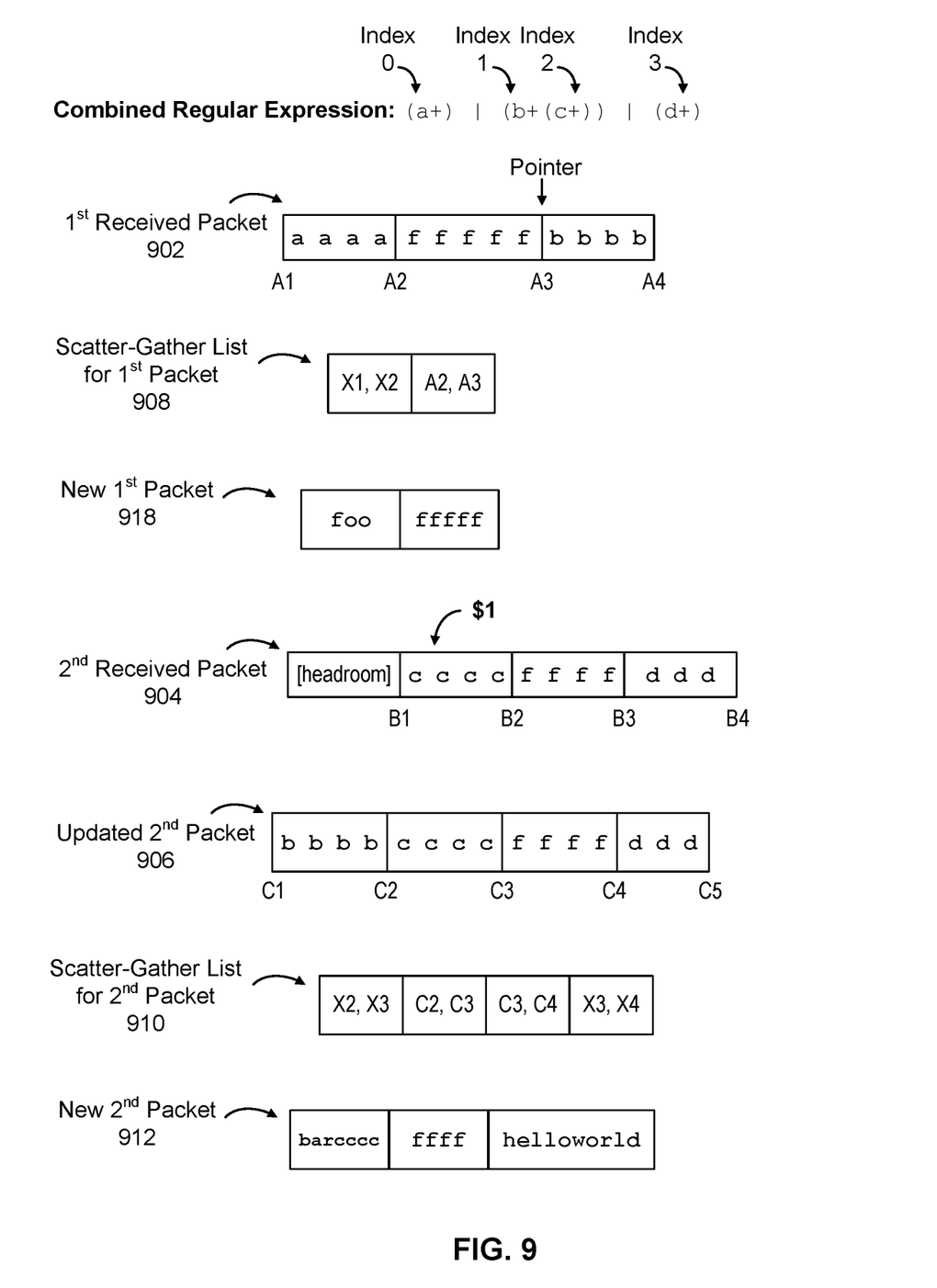
FIG. 9 illustrates an example of payload matching via single pass transformation of a payload in which a portion of the payload packet partially matches a regular expression.

FIG. 8 is a flow chart illustrating an embodiment of a process for transforming a payload in a single pass in which a portion of a payload packet partially matches a regular expression. The process can be performed as part of another process such as part of 404 of FIG. 4. The process can be performed by a proxy server such as the one shown in FIG. 3. The process will be described using the example shown in FIG. 9. FIG. 9 illustrates an example of payload matching via single pass transformation of a payload in which a portion of the payload packet partially matches a regular expression. The example here is the same as FIG. 7 except for the noted differences. For simplicity, regular expression table 712, replacement strings 714, and capture table 716 are not shown in FIG. 9, but they are constructed/stored in the same manner as FIGS. 6 and 7.

The process determines whether there is a partial match (802). Suppose packet 902 is received and being parsed. When the process reaches the pointer shown and sees that the packet ends with "bbbb," it detects a partial match to "b+(c+)" because "bbbb" should be followed by at least one "c," but the packet has ended.

If there is no partial match, the process proceeds to parse a remaining portion of the payload packet (806). In various embodiments, replacement rules are applied to fully matched portions. Unmatched portions are forwarded to be sent. For example, the process returns to 406 to determine a scatter-gather list including original payload piece(s) and replacement payload piece(s).

Otherwise, if there is a partial match, the process releases the payload packet up to the point of partial match (804). Referring to FIG. 9 in which packet 902 is received first followed by packet 904, packet 902 ends with "bbbb" and packet 904 begins with "cccc" (possibly with some headroom before "cccc"). The payload transformation process reaches "bbbb" in packet 902 and determines that this is a partial match because b+ is expected to be followed by c+. However, packet 902 ends with "bbbb." The process releases the payload packet up to "fffff" In various embodiments, releasing the payload packet allows the released portion of the packet to be forwarded to the client without needing to wait for the rest of the packet. Packets can be streamed/released to a client as soon as they are received without needing to wait for other packets to arrive. The released portion of the packet has already been transformed. Here, the transformed packet is new 1st packet 918, which is "foofffff". New 1st packet 918 is formed from the first scatter-gather list 908 by the same procedures described with respect to FIG. 7. The scatter-gather list is formed by the same procedures described with respect to FIG. 7 and using the tables and replacement strings shown in 712, 714, and 716. The first scatter-gather list 908 includes the replacement for "aaaa" (which matched capture a+) and the packet portion "fffff," which has no replacement. The portion of the packet that has not been released is the partially matching portion. Here, the partially matching portion is "bbbb."

Returning to FIG. 8, the process determines whether there is sufficient headroom in the next packet (808). In various protocols, packets have some headroom (placeholder space) to allow information to be appended to the packet. Headroom is considered to be sufficient if the withheld portion can fit inside the headroom. Here, if "bbbb" fits in the headroom of packet 904 then the process determines that there is sufficient headroom.

Returning to FIG. 8, if there is sufficient headroom, then the process stitches the partially matching portion to the next packet (810). The partially matching portion is placed into the next packet's headroom. This forms a combined packet that concatenates the partially matching portion to the next packet. Conceptually, the combined packet is shown in 906 in which received packet 904 contents are preceded by the partially matching portion of packet 902. The combined packet is, in various embodiments, a new version of the received packet and not a separately copied/created packet. However, if there is insufficient headroom for the withheld portion to be added to the next packet, then the process creates a combined packet with the partially matching portion and a copy of the next packet (814). Put another way, combined packet 906 shows the contents of updated received packet 904 if there is sufficient headroom. If there is not enough headroom, then combined packet 906 is formed from the withheld portion concatenated to a copy of received packet 904. Since there is often sufficient headroom to store the partially match portion, copying of data to the combined packet does not occur frequently, thus both processor and memory uses are reduced.

In either case (following 810 or 814), the process proceeds to 812 in which the process continues with matching using the combined regular expression until the packet is processed. A scatter-gather list 910 is formed for the second packet (904). The scatter-gather list is formed by the same procedures described with respect to FIG. 7 and using the tables and replacement strings shown in 712, 714, and 716. The second scatter-gather list 910 includes the replacement for "bbbbcccc" (which matched capture b+(c+)) and the replacement for "ddd" (which matched capture d+). New 2nd packet 912 is formed from the second scatter-gather list 910 by the same procedures described with respect to FIG. 7.

Figure 10:
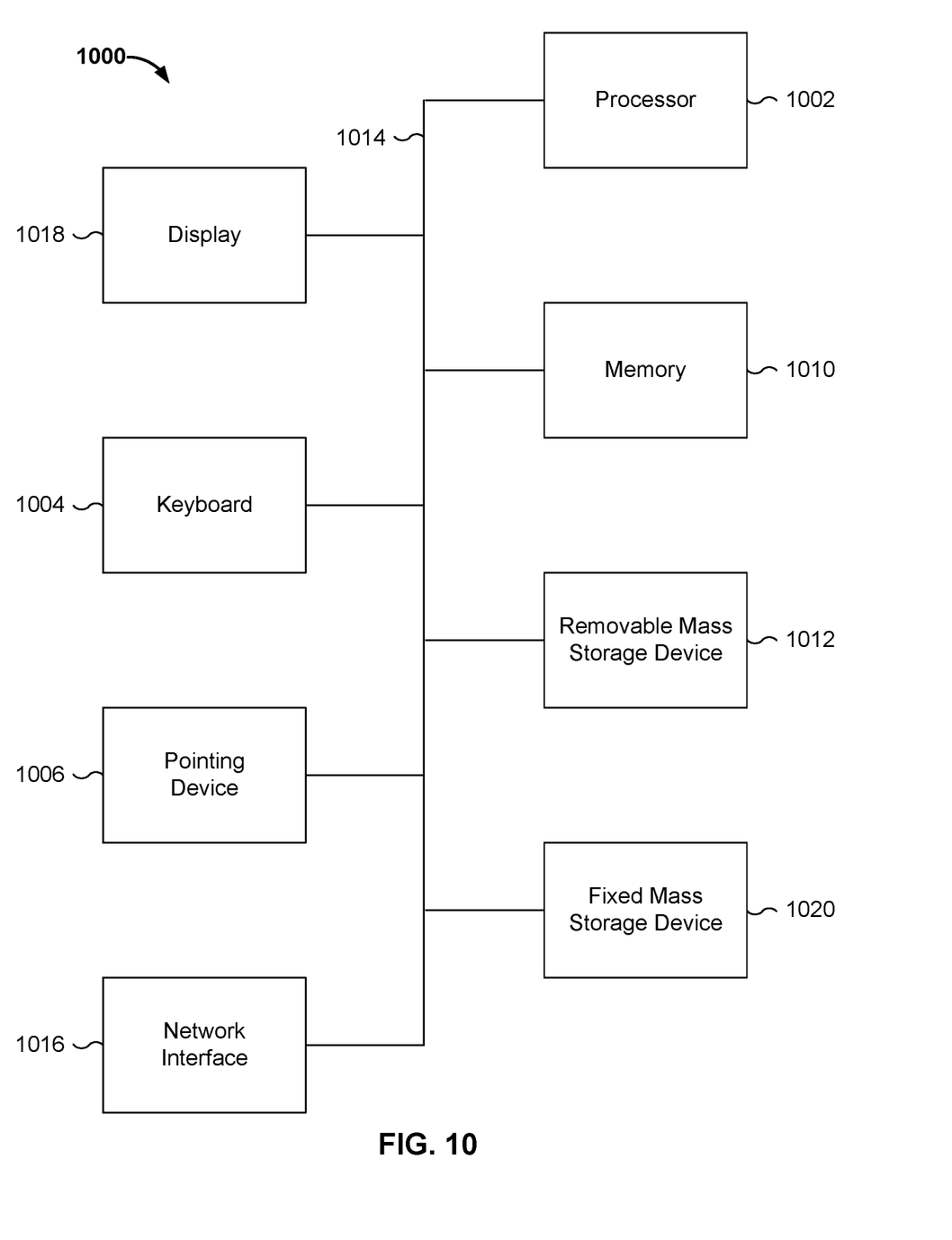
FIG. 10 is a functional diagram illustrating a programmed computer system for payload matching via single pass transformation of a payload in accordance with some embodiments.

FIG. 10 is a functional diagram illustrating a programmed computer system for payload matching via single pass transformation of a payload in accordance with some embodiments. As will be apparent, other computer system architectures and configurations can be used to perform the described payload transformation technique. Computer system 1000, which includes various subsystems as described below, includes at least one microprocessor subsystem (also referred to as a processor or a central processing unit (CPU) 1002). For example, processor 1002 can be implemented by a single-chip processor or by multiple processors. In some embodiments, processor 1002 is a general purpose digital processor that controls the operation of the computer system 1000. In some embodiments, processor 1002 also includes one or more coprocessors or special purpose processors (e.g., a graphics processor, a network processor, etc.). Using instructions retrieved from memory 1010, processor 1002 controls the reception and manipulation of input data received on an input device (e.g., pointing device 1006, keyboard 1004), and the output and display of data on output devices (e.g., display 1018).

Processor 1002 is coupled bi-directionally with memory 1010, which can include, for example, one or more random access memories (RAM) and/or one or more read-only memories (ROM). As is well known in the art, memory 1010 can be used as a general storage area, a temporary (e.g., scratch pad) memory, and/or a cache memory. Memory 1010 can also be used to store input data and processed data, as well as to store programming instructions and data, in the form of data objects and text objects, in addition to other data and instructions for processes operating on processor 1002. Also as is well known in the art, memory 1010 typically includes basic operating instructions, program code, data, and objects used by the processor 1002 to perform its functions (e.g., programmed instructions). For example, memory 1010 can include any suitable computer readable storage media described below, depending on whether, for example, data access needs to be bi-directional or uni-directional. For example, processor 1002 can also directly and very rapidly retrieve and store frequently needed data in a cache memory included in memory 1010.

A removable mass storage device 1012 provides additional data storage capacity for the computer system 1000, and is optionally coupled either bi-directionally (read/write) or uni-directionally (read only) to processor 1002. A fixed mass storage 1020 can also, for example, provide additional data storage capacity. For example, storage devices 1012 and/or 1020 can include computer readable media such as magnetic tape, flash memory, PC-CARDS, portable mass storage devices such as hard drives (e.g., magnetic, optical, or solid state drives), holographic storage devices, and other storage devices. Mass storages 1012 and/or 1020 generally store additional programming instructions, data, and the like that typically are not in active use by the processor 1002. It will be appreciated that the information retained within mass storages 1012 and 1020 can be incorporated, if needed, in standard fashion as part of memory 1010 (e.g., RAM) as virtual memory.

In addition to providing processor 1002 access to storage subsystems, bus 1014 can be used to provide access to other subsystems and devices as well. As shown, these can include a display 1018, a network interface 1016, an input/output (I/O) device interface 1004, an image processing device 1006, as well as other subsystems and devices. For example, pointing device 1006 can include a camera, a scanner, etc.; keyboard 1004 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 1000. Multiple I/O device interfaces can be used in conjunction with computer system 1000. The I/O device interface can include general and customized interfaces that allow the processor 1002 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 1016 allows processor 1002 to be coupled to another computer, computer network, or telecommunications network using a network connection as shown. For example, through the network interface 1016, the processor 1002 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 1002 can be used to connect the computer system 1000 to an external network and transfer data according to standard protocols. For example, various process embodiments disclosed herein can be executed on processor 1002, or can be performed across a network such as the Internet, intranet networks, or local area networks, in conjunction with a remote processor that shares a portion of the processing. Additional mass storage devices (not shown) can also be connected to processor 1002 through network interface 1016.

In addition, various embodiments disclosed herein further relate to computer storage products with a computer readable medium that includes program code for performing various computer-implemented operations. The computer readable medium is any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 10 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 1004 and display 1018 share the touch sensitive screen component, which both detects user inputs and displays outputs to the user). In addition, bus 1014 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

Techniques for single-pass payload transformation techniques have been described. They improve the technical field of Web traffic handling. They also improve the functioning of a proxy server by better using available resources such as reducing the number of processing cycles used to complete a payload transformation or using less memory to store data associated with payload transformation.

What is claimed is:
1. A method of modifying web address strings in packet payloads, the method comprising:
   identifying an initial web address string in a payload of an initial packet destined for a recipient;

using a combined expression, which includes a plurality of individual expressions, to perform a matching operation on the initial web address string, wherein each individual expression comprises at least one match pattern and is associated with a replacement string, wherein using the combined expression comprises comparing each individual expression with the initial web address string to determine whether the match pattern of the individual expression matches any portion of the initial web address string;

identifying, based on the results of the matching operation, one or more portions of the initial web address string that match the combined expression;

constructing a new web address string by replacing any identified portion in the initial web address string with the replacement string associated with the individual expression comprising the match pattern that matched the identified portion; and sending, to the recipient, a new packet with a payload that comprises the new web address string.

2. The method of claim 1, wherein the recipient is a backend server accessed using the new web address string, wherein the association of each individual expression with a replacement string is based on a user-defined policy regarding redirection of packets with payloads comprising the initial web address string to the backend server.

3. The method of claim 2, wherein the individual expressions in the combined expression are also based on the user-defined policy.

4. The method of claim 1 further comprising generating an expression table including at least one mapping of an individual expression in the combined expression to a replacement string.

5. The method of claim 4 further comprising:

generating a capture table including at least one mapping of a capture index to an expression table index, wherein each capture index corresponds to a location in the initial web address string of a matching portion that matches an individual expression in the combined expression, and wherein each expression table index corresponds to an entry associated with the matching individual expression in the expression table.

6. The method of claim 1, wherein constructing the new web address string comprises (i) identifying a first set of memory addresses of a set of portions of the initial web address string, (ii) identifying a second set of memory addresses of a set of replacement strings corresponding to portions of the initial web address string that match to a set of individual expressions, (iii) using the first set of memory addresses to lookup data for portions of the new web address string that do not match any individual expressions, and (iv) using the second set of addresses to lookup data for portions of the new web address string that do match an individual expression.

7. The method of claim 1, wherein comparing the individual expressions with the initial web address string comprises:

providing, to an expression engine, the initial web address string and the combined expression;

receiving match results from the expression engine, said match results comprising a set of capture indexes corresponding to a set of locations of a set of matching portions of the web address string;

looking up each capture index in a first table to find a corresponding replacement rule using the received match results, wherein the first table comprises a plurality of mappings of a plurality of capture indexes to corresponding replacement rules; and determining, for each corresponding replacement rule, a replacement string associated with the replacement rule by looking up the replacement rule in a second table comprising a plurality of mappings of a plurality of replacement rules to corresponding replacement strings.

8. The method of claim 7, wherein the expression engine is implemented using a Perl Compatible Regular Expressions (PCRE) library.

9. The method of claim 7, wherein at least one replacement string includes a string literal.

10. The method of claim 7, wherein at least one replacement string includes a variable.

11. The method of claim 7, wherein at least one replacement string includes a reference to a portion of the initial web address string.

12. The method of claim 1, wherein sending the new packet to the recipient comprises streaming the new packet without buffering.

13. The method of claim 1, wherein sending the new packet to the recipient comprises sending the new packet to the recipient before receiving the end of an entire transaction associated with a sequence of initial packets.

14. The method of claim 1, wherein the initial packet is part of an HTTP request directed to the recipient.

15. The method of claim 1, wherein comparing each individual expression comprises identifying a particular portion of the initial web address string that partially matches at least one individual expression;

sending a first new packet to the recipient with a payload that comprises a new web address comprising a set of replacement strings for a set of portions of the initial web address that each (i) fully matched one of the individual expressions and (ii) preceded the particular portion in the initial web address string;

generating a second new packet by inserting, into a subsequently received packet, a portion of the initial web address string that includes (i) the partially matching particular portion and (ii) a portion of the initial web address string that follows the partially matching particular portion in the web address string; and performing the matching operation on the second new packet.

16. The method of claim 1, wherein comparing each individual expression comprises identifying a particular portion of the initial web address string that partially matches at least one individual expression;

sending a first new packet to the recipient with a payload that comprises a new web address comprising a set of replacement strings for a set of portions of the initial web address that each (i) fully matched one of the individual expressions and (ii) preceded the particular portion in the initial web address string;

determining that there is insufficient space in a subsequently received packet;

generating a second new packet by creating a copy of the subsequently received packet and inserting, into the copy of the subsequently received packet, a portion of the initial web address string that includes (i) the partially matching particular portion and (ii) a portion of the initial web address string that follows the partially matching particular portion in the initial web address string; and performing the matching operation on the second new packet.

17. The method of claim 1, wherein at least one individual expression comprises a first match pattern and a second match pattern, wherein a particular replacement string is associated with both the first and the second match patterns.

18. The method of claim 17, wherein the particular replacement string comprises a reference to a portion of the initial web address string that matches the second match pattern.

19. A system comprising:
a set of processing units; and
a non-transitory machine readable medium storing a program which when executed by at least one of the processing units modifies web address strings in packet payloads, the program comprising sets of instructions for:
identifying an initial web address string in a payload of an initial packet destined for a recipient;
using a combined regular expression, which includes a plurality of individual expressions, to perform a matching operation on the initial web address string, wherein each individual expression comprises at least one match pattern and is associated with a replacement string, wherein using the combined expression comprises comparing each individual expression with the initial web address string to determine whether the match pattern of the individual expression matches any portion of the initial web address string;
identifying, based on the results of the matching operation, one or more portions of the initial web address string that match the combined expression;
constructing a new payload web address string by replacing any identified portion in the initial web address string with the replacement string associated with the individual expression comprising the match pattern that matched the identified portion; and
sending, to the recipient, a new packet with a payload that comprises the new web address string.

20. A non-transitory machine readable medium storing a program which when executed by at least one processing unit modifies web address strings in packet payloads, the program comprising sets of instructions for:
identifying an initial web address string in a payload of an initial packet destined for a recipient;
using a combined expression, which includes a plurality of individual expressions, to perform a matching operation on the initial web address string, wherein each individual expression comprises at least one match pattern and is associated with a replacement string, wherein using the combined expression comprises comparing each individual expression with the initial web address string to determine whether the match pattern of the individual expression matches any portion of the initial web address string;
identifying, based on the results of the matching operation, one or more portions of the initial web address string that match the combined expression;
constructing a new web address string by replacing any identified portion in the initial web address string with the replacement string associated with the individual expression comprising the match pattern that matched the identified portion; and
sending, to the recipient, a new packet with a payload that comprises the new web address string.

* * * * *